United States Patent [19]

Watanabe et al.

[11] Patent Number: 5,412,050
[45] Date of Patent: May 2, 1995

[54] POLYMER HAVING A NARROW DISPERSION OF MOLECULAR WEIGHT AND A MANUFACTURING PROCESS THEREOF

[75] Inventors: Osamu Watanabe, Joetsu; Motoyuki Yamada, Ohmiya; Fujio Yagihashi, Yokohama; Akira Yamamoto, Joetsu; Yoshinobu Isono, Nagaoka, all of Japan

[73] Assignee: Shin-Etsu Chemical Co., Ltd., Tokyo, Japan

[21] Appl. No.: 109,050

[22] Filed: Aug. 19, 1993

[30] Foreign Application Priority Data

| Aug. 19, 1992 | [JP] | Japan | 4-241452 |
| Aug. 19, 1992 | [JP] | Japan | 4-241453 |
| Aug. 19, 1992 | [JP] | Japan | 4-241454 |
| Aug. 19, 1992 | [JP] | Japan | 4-241455 |
| Aug. 19, 1992 | [JP] | Japan | 4-241456 |
| Aug. 21, 1992 | [JP] | Japan | 4-245547 |

[51] Int. Cl.$^6$ .............................................. C08F 16/26
[52] U.S. Cl. ............................................. 526/313
[58] Field of Search ........................................ 526/313

[56] References Cited

PUBLICATIONS

"Synthesis of Poly(p-hydroxy-α-methyl styrene) by Cationic Polymerization" Ito et al. Macromolecules 1983, 16, 510–517.

*Primary Examiner*—Joseph L. Schofer
*Assistant Examiner*—N. Sarofim
*Attorney, Agent, or Firm*—Millen, White, Zelano & Branigan

[57] ABSTRACT

A polystyrene type monodispersion polymer having at least a monomer unit represented by the following general formula (I), and having a molecular weight which lies in the range 500–500,000 and manufacturing process thereof are disclosed;

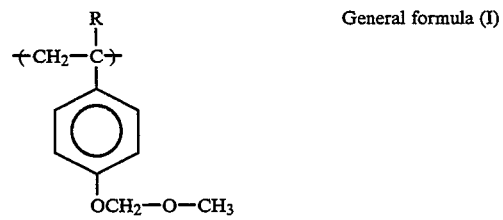

General formula (I)

where R is a hydrogen atom or methyl group, and the R in the molecule may be identical or different.

18 Claims, 9 Drawing Sheets

POLYMER HAVING A NARROW DISPERSION OF MOLECULAR WEIGHT AND A MANUFACTURING PROCESS THEREOF

FIELD OF THE INVENTION

This invention relates to a novel polymer, and its method of manufacture. In particular, it relates to a functional polymer having a narrow dispersion of molecular weight, and its method of manufacture.

BACKGROUND OF THE INVENTION

Functional polymers are widely employed as resist materials for high resolution lithography in the manufacture of LSI (Large Scale Integrated Circuits) used in computers.

In recent years, with the growth of LSI manufacturing technology, LSI circuits are achieving even higher densities, and a demand has emerged for resist materials having high resolution and high reproducibility suitable for these densities.

It is theoretically known that an effective way of increasing the resolution of resist materials is to narrow the molecular weight distribution of the polymer used in the resist (monodispersion type polymer).

Conventionally, novolac resins were used as polymers for monodispersion type resist materials, and fractionation was used to control their molecular weight distribution (e.g. Japanese Tokkai Sho 62-121754).

This fractionation operation is however difficult to carry out, requires much time, and does not fully meet stringent performance requirements. A satisfactory solution to this problem was therefore desired.

Chemical amplifier type resist materials having functional groups which can easily be removed by acids and different solubility before and after removal of these functional groups, have been studied due to their excellent workability with a view to improving the manufacturing efficiency of LSI.

Styrene derivative polymers having excellent plasma resistance are examples of such chemical amplifier resist materials.

However, as styrene derivative polymers used as resist materials are conventionally manufactured by radical polymerization or condensation polymerization, it is difficult to control their molecular weight and molecular weight distribution. It was thus difficult to manufacture a styrene derivative polymer of monodispersion type which could fully satisfy the performance requirements of a resist material.

After intensive studies of styrene derivative polymers, the Inventors discovered a novel polymer of the monodispersion type having the performance requirements of a resist material and its method of manufacture, Which led to the present invention.

SUMMARY OF THE INVENTION

It is therefore a first object of this invention to provide a novel polymer of the monodispersion type which satisfies the performance requirements of a resist material.

It is a second object of this invention to provide a method of manufacturing a novel polymer of the monodispersion type which satisfies the performance requirements of a resist material and of which the molecular weight can be controlled to a desired value.

The aforesaid objects are achieved by a polystyrene monodispersion type polymer having a monomer unit represented by the following general formula (I), and optionally a styrene monomer unit, and its method of manufacture.

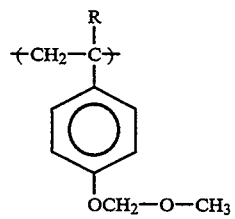

General formula (I)

where R is a hydrogen atom or methyl group, and where the R in one molecule may be the same or different.

The novel polymer of this invention is a mono-dispersion polymer having a narrow molecular weight distribution, and which therefore satisfies the performance requirements for high resolution resist materials.

Further, according to the manufacturing method of this invention, the molecular weight can be controlled to any desired value, hence a monodispersion type polymer having properties suited to a specific application can be easily manufactured.

DETAILED DESCRIPTION OF THE INVENTION

Figure 1:
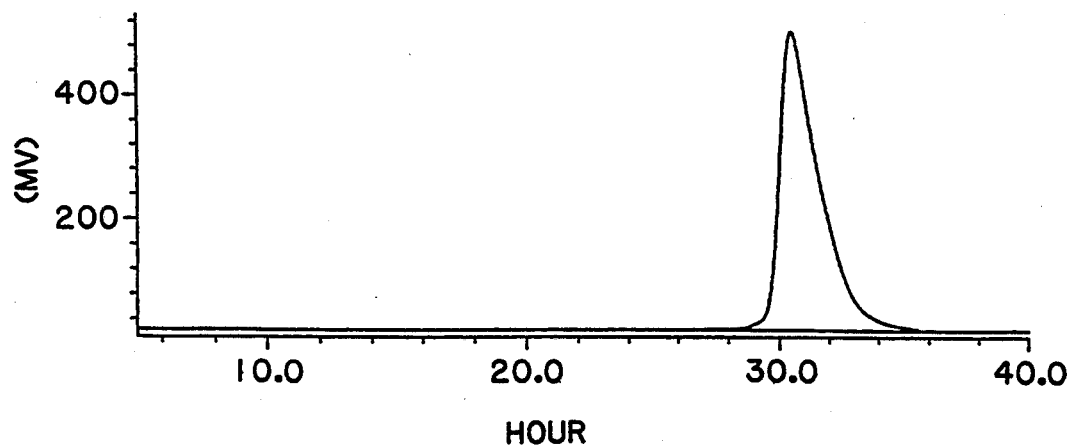
FIG. 1 shows a GPC elution curve of the poly(p-methoxymethoxystyrene) having number average molecular weight of 12,000 g/mole, synthesized in the Example 1.

In the context of this invention, a monodispersion refers to a material wherein the ratio of the weight average molecular weight $M_w$ to the number average molecular weight $M_n$ i.e. $M_w/m_n$, lies within the range 1.01–1.50.

The weight average molecular weight may be easily found in the case of a living polymer by calculation from the weight of monomer and the mole number of the initiator, or by the light scattering method. The number average molecular weight may be easily measured using a film osmometer.

The molecular weight distribution of the polymer may be found by gel permeation chromatography (GPC), and its molecular structure may be easily verified by the infrared (IR) absorption spectrum, or the $_1$H-NMR spectrum.

The randomness of the copolymer may be easily verified by measuring its Tg (glass transition temperature) by DSC.

The monodispersion type polymer of this invention may be easily manufactured by anionic polymerization of the monomer represented by a general formula (II), optionally together with styrene;

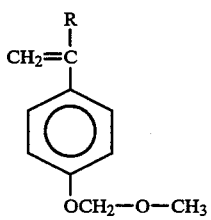

General formula (II)

where R is a hydrogen atom or methyl group.

It is preferable that styrene monomer units are present in the polymer to the extent of at least 0.01 moles.

According to this invention, when performing the anionic polymerization, it is preferable from the viewpoint of obtaining a good monodispersion to use any known living anionic initiator, and particularly preferable to use an organometallic compound.

Examples of suitable organometallic compounds are organoalkyl metal compounds such as n-butyl lithium, sec-butyl lithium, tert-butyl lithium, sodium naphthalene, sodium anthracene, disodium α-methylstyrene tetramer, cumyl potassium and cumyl cesium.

According to this invention, the anionic polymerization may be carried out in a non-solvent system, but from the viewpoint of easily controlling the reaction rate, it is preferable to carry it out in an organic solvent.

Examples of suitable organic solvents are aromatic hydrocarbons such as benzene and toluene, cyclic ethers such as tetrahydrofuran, dioxane and tetrahydropyran, or aliphatic hydrocarbons such as dimethoxyethane, n-hexane and cyclohexane.

These organic solvents may be used either alone or in admixture with each other, tetrahydrofuran being particularly preferred.

It is preferable that the total concentration of monomer in the organic solvent at the start of polymerization lies in the range 1–40 weight %.

In order to prevent reaction with oxygen, it is preferable that the polymerization reaction be carried out under high vacuum or in an inert gas such as nitrogen. The reaction temperature may be chosen to be any suitable temperature in a range from −100° C. to the boiling point of the reaction solution, however it is preferable that if tetrahydrofuran is the solvent the temperature lies in the range −78° C.-0° C., and if benzene is the solvent the temperature is room temperature.

By carrying out the reaction for a period of approximately 10 min-30 hours, a polystyrene type monodispersion polymer having a monomer unit represented by the following general formula (I) and if necessary a styrene monomer unit, can be obtained.

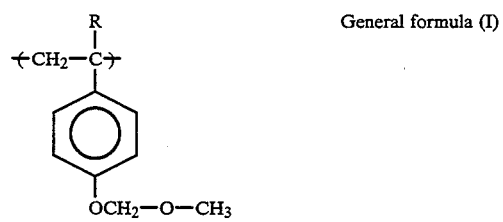

General formula (I)

Polymers other than polyhydroxystyrene which are obtained by removing at least some of the —CH$_2$O—CH$_3$ groups so as to replace corresponding —OCH$_2$O—CH$_3$ groups of the polymer obtained as described hereintofore by hydroxyl groups, are also novel polymers.

Removal of these —CH$_2$—O—CH$_3$ groups may be easily performed by dissolving the aforesaid polymer in a solvent such as dioxane, acetone, acetonitrile, benzene or water or in a mixture of these solvents, and then dripping in the obtained solution an acid such as hydrobromic acid. This reaction moreover takes place without cleavage of the main polymer chain or intermolecular crosslinking, so the polymer obtained is also a monodispersion.

The polymerization reaction may be terminated by adding a terminator such as methanol, water or methyl bromide, and a (co)polymer having a desired molecular weight may thus be easily obtained. As the active ends during the polymerization reaction have the characteristic color of anions, it may be easily verified whether or not the reaction has been terminated by the presence or absence of this color.

If a random copolymer is to be obtained according to this invention, the monomers to be reacted may be first mixed together, and the resulting mixture then polymerized.

If a block copolymer is to be obtained according to this invention, the monomers are polymerized in succession, i.e. one type of monomer is first polymerized, and the other monomers are then added and polymerized one by one.

If a living anionic polymerization is carried out, 100% of the monomer reacts. The molecular weight of the polymer obtained may thus be suitably controlled by adjusting the amount of monomer used and the mole number (number of molecules) of the living anionic initiator added.

The molecular weight distribution of the (co)polymer so obtained is that of a monodispersion ($M_w/M_n = 1.01-1.50$).

According to this invention, the number average molecular weight of the (co)polymer may lie in the range 500–500,000, but it preferably lies in the range 3,000–300,000.

EXAMPLES

This invention will now be described with reference to specific examples, but it should be understood that the invention is not to be construed as being limited by them in any way.

Example 1.

Synthesis of p-methoxymethoxystyrene(monomer)
(1) Synthesis of p-methoxymethoxybromobenzene A toluene suspension of 93.18 g (1.725 mole) of sodium methylate ($CH_3ONa$) was dripped for 1 hour into 1 liter of a toluene solution of 259.2 g (1.5 mole) of p-bromophenol while heating under reflux, and the methanol ($CH_3OH$) produced during the reaction was removed.

After continuing this reaction and distillation for 2 hours and verifying that methanol was no longer coming off, the reaction system was cooled in ice to 0°–10° C. Next, 120.8 g (1.5 mole) of chloromethylmethylether was dripped in for 2 hours with stirring, the cooling bath was removed, and the temperature was raised to room temperature.

The reaction mixture thus obtained was washed with cooled sodium hydroxide solution, dried by magnesium sulfate ($MgSO_4$), and concentrated under reduced pressure to give a concentrate. This concentrate was distilled under reduced pressure so as to obtain 131.72 g of p-methoxy methoxybromobenzene. The yield of p-methoxymethoxybromobenzene was 40.5%, and it had a boiling point of 122°–125° C. at a pressure of 14 Torr.
(2) Synthesis of p-methoxymethoxystyrene 40 ml (0.56 mole) of vinyl bromide was added to and dissolved in 150 ml of cooled tetrahydrofuran, nickel chloride ($NiCl_2$) was added, and the reaction system cooled to 0°–10° C.

A Grignard reagent prepared from 69.3 g of the p-methoxymethoxybromobenzene synthesized as described hereinabove (purity 94%: 0.3 mole) and 10.0 g (0.411 gram atom) of magnesium (Mg) in 150 ml of tetrahydrofuran, was dripped into the mixture obtained at a temperature not exceeding 15° C. for 2 hours, and after stirring at a temperature of 0°–10° C. for 2 hours, the temperature of the reaction system was gradually raised to room temperature.

After adding a small amount of hydroquinone to the reaction mixture, it was washed successively with an aqueous solution of ammonium chloride ($NH_4Cl$), an aqueous solution of sodium hydrogencarbonate ($NaHCO_3$), and an aqueous solution of sodium chloride (NaCl). It was then dried using magnesium sulfate ($MgSO_4$), and the resulting solution was concentrated under reduced pressure to give a concentrate.

This concentrate was distilled under reduced pressure so as to obtain 18.94 g of p-methoxymethoxystyrene.

The yield of the product was 38.4%, and it had a boiling point of 93°–94° C. at a pressure of 14 Torr. In order to synthesize the poly(p-methoxymethoxystyrene) of this embodiment, the p-methoxymethoxystyrene (monomer) obtained as described hereintofore was first distilled in the presence of $CaH_2$, and purified using sodium benzophenone to give a monomer free of water and other impurities.

Synthesis of poly(p-methoxymethoxystyrene)

1,500 ml of tetrahydrofuran as solvent and $5.5 \times 10^{-3}$ mole of n-butyl lithium as polymerization initiator were introduced into a 2 liter flask, and cooled to $-78°$ C. 70 g of the aforesaid p-methoxymethoxystyrene monomer (dissolved in 50 ml of tetrahydrofuran and cooled to $-78°$ C.) was then added, and a living polymerization reaction carried out for 2 hours. The resulting solution had a red color.

The reaction was terminated by adding methanol to the reaction solution.

The reaction mixture was poured into methanol to precipitate the polymer. This precipitate was separated and dried, giving 70 g of a white product. From its $_1$H-NMR and IR spectra, it was found that this product was poly(p-methoxymethoxystyrene) having some unreacted active ends remaining in the methoxymethoxy groups, and from its GPC elution curve (FIG. 1), it was found to be a monodispersion ($M_w/M_n = 1.07$).

The number average molecular weight measured by a film osmometer was $1.20 \times 10^4$ g/mole, The aforesaid $^1$H-NMR results were as follows:
1.4–2.2 ppm: (broad, 3H, —$CH_2$—CH—)
3.5–4.0 ppm: (broad, 3H, —H, —$OCH_3$)
5.0–5.5 ppm: (broad, 2H, —O—$CH_2$—O—)
6.0–7.0 ppm: (broad, 4H, $C_6H_4$)

Example 2.

Synthesis of poly(p-methoxymethoxystyrene)

The same procedure as in Example 1 was followed with the exceptions that 1,000 ml of tetrahydrofuran as solvent and $1 \times 10^{-3}$ mole of potassium naphthalene as polymerization initiator were introduced into a 2 liter flask and cooled to $-78°$ C., 50 g of the p-methoxymethoxystyrene monomer synthesized in Example 1 (dissolved in 100 ml of tetrahydrofuran and cooled to $-78°$ C.) was added, and a living polymerization reaction carried out for 1 hour. 50 g of a white polymer was obtained.

Figure 2:
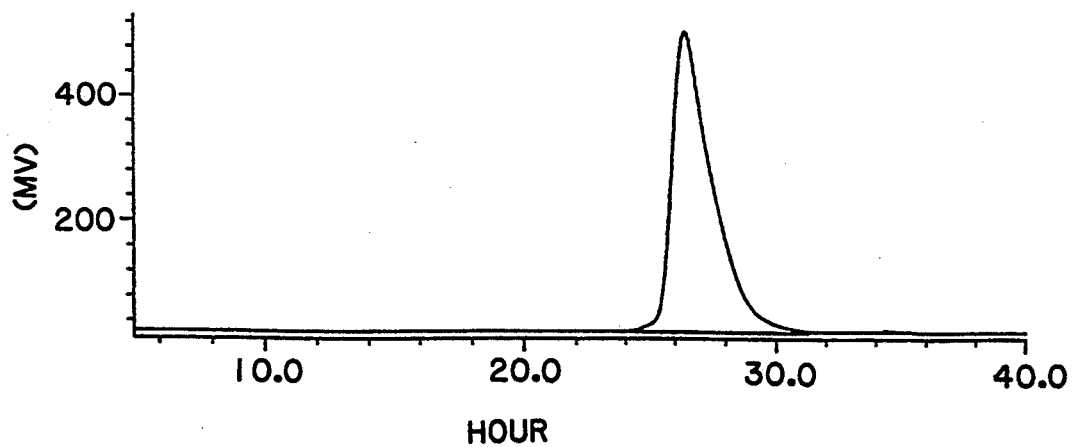
FIG. 2 shows a GPC elution curve of the poly(p-methoxymethoxystyrene) having number average molecular weight of 48,000 g/mole, synthesized in the Example 2.

From the $^1$H-NMR spectrum of this product that showed the same characteristic absorptions as those of Example 1, it was found that this product was poly(p-methoxymethoxystyrene) having some unreacted active ends remaining in the methoxymethoxy groups, and from its GPC elution curve (FIG. 2), it was found to be a monodispersion ($M_w/M_n = 1.04$).

The number average molecular weight measured by a film osmometer was $4.8 \times 10^4$ g/mole.

Example 3.

Synthesis of p-methoxymethoxy-α-methylstyrene (monomer)

48 ml (0.56 mole) of isopropenyl bromide was added to and dissolved in 150 ml of cooled tetrahydrofuran, nickel chloride (NiCl$_2$) was added, and the reaction system cooled to 0°–10° C.

A Grignard reagent prepared from 69.3 g of the p-methoxymethoxybromobenzene synthesized as described Example 1 (purity 94%: 0.3 mole) and 10.0 g (0.411 gram atom) of magnesium (Mg) in 150 ml of tetrahydrofuran, was dripped into the mixture obtained at a temperature not exceeding 15° C. for 2 hours, and after stirring at a temperature of 0° C.–10° C. for 2 hours, the temperature of the reaction system was gradually raised to room temperature.

After adding a small amount of hydroquinone to the reaction mixture, it was washed successively with an aqueous solution of ammonium chloride (NH$_4$Cl), an aqueous solution of sodium hydrogencarbonate (NaHCO$_3$), and an aqueous solution of sodium chloride (NaCl). It was then dried using magnesium sulfate (MgSO$_4$), and the resulting solution concentrated under reduced pressure to give a concentrate.

This concentrate was distilled under reduced pressure so as to obtain 15 g of p-methoxymethoxy-α-methylstyrene.

The yield of the product was 26%, and it had a boiling point of 110°–112° C. at a pressure of 10 Torr. In order to synthesize the poly(p-methoxymethoxy-α-methylstyrene) of this embodiment, the p-methoxymethoxy-α-methylstyrene (monomer) obtained as described hereintofore was first distilled in the presence of CaH$_2$, and purified using sodium benzophenone to give a monomer free of water and other impurities.

Synthesis of poly(p-methoxymethoxy-α-methylstyrene)

1,300 ml of tetrahydrofuran as solvent and $5.5 \times 10^3$ mole of n-butyl lithium as polymerization initiator were introduced into a 2 liter flask, and cooled to $-20°$ C. 90 g of the aforesaid p-methoxymethoxy-α-methylstyrene monomer (dissolved in 50 ml of tetrahydrofuran and cooled to $-20°$ C.) was then added, and a living polymerization reaction carried out for 1 hour, next a growth reaction carried out for 5 hours in $-78°$ C. The resulting solution had a red color.

The reaction was terminated by adding methanol to the reaction solution.

Figure 3:
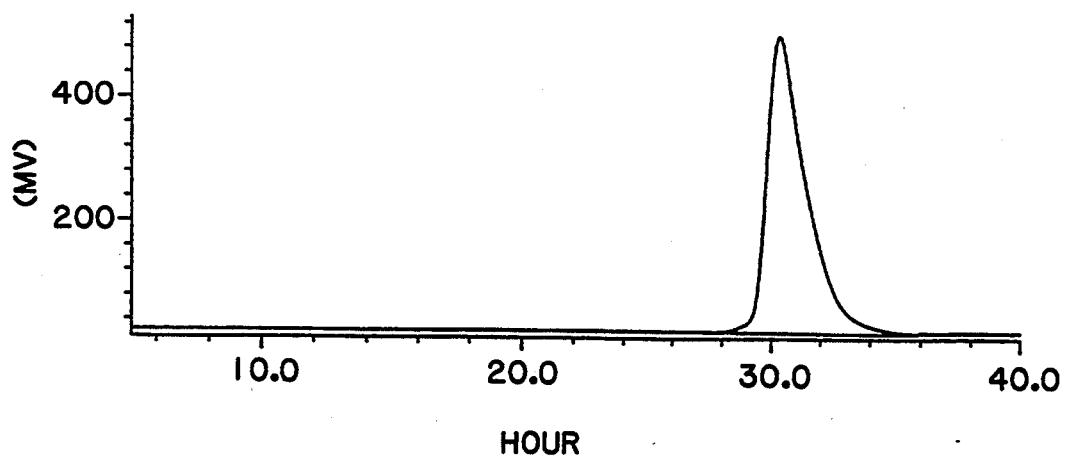
FIG. 3 shows a GPC elution curve of the poly(p-methoxymethoxy-α-methylstyrene) having number average molecular weight of 15,000 g/mole, synthesized in the Example 3.

The reaction mixture was poured into methanol to precipitate the polymer. This precipitate was separated and dried, giving 90 g of a white product. From its $^1$H-NMR and IR spectra, it was found that this product was poly(p-methoxymethoxy-α-methylstyrene) having some unreacted active ends remaining in the methoxymethoxy groups, and from its GPC elution curve (FIG. 3), it was found to be a monodispersion (M$_w$/M$_n$=1.09).

The number average molecular weight measured by a film osmometer was $1.50 \times 10^4$ g/mole.

The aforesaid $^1$H-NMR results were as follows:
1.4–1.8 ppm: (broad, 2H, —CH$_2$—C(CH$_3$)—)
1.4–1.8 ppm: (broad, 3H, —CH$_2$—C(CH$_3$)—)
3.5–4.0 ppm: (broad, 3H, —OCH$_3$)
5.0–5.5 ppm: (broad, 2H, —O—CH$_2$—O—)
6.0–7.0 ppm: (broad, 4H, C$_6$H$_4$)

Example 4.

Synthesis of poly(p-methoxymethoxy-α-methylstyrene)

The same procedure as in Example 3 was followed with the exceptions that 1,000 ml of tetrahydrofuran as solvent and $5 \times 10^{-4}$ mole of cumyl cesium as polymerization initiator were introduced into a 2 liter flask and cooled to $-78°$ C., 50 g of the p-methoxymethoxy-α-methylstyrene monomer synthesized in Example 3 (dissolved in 100 ml of tetrahydrofuran and cooled to $-78°$ C.) was added, and a living polymerization reaction carried out for 5 hours, 40 g of a white polymer was obtained.

Figure 4:
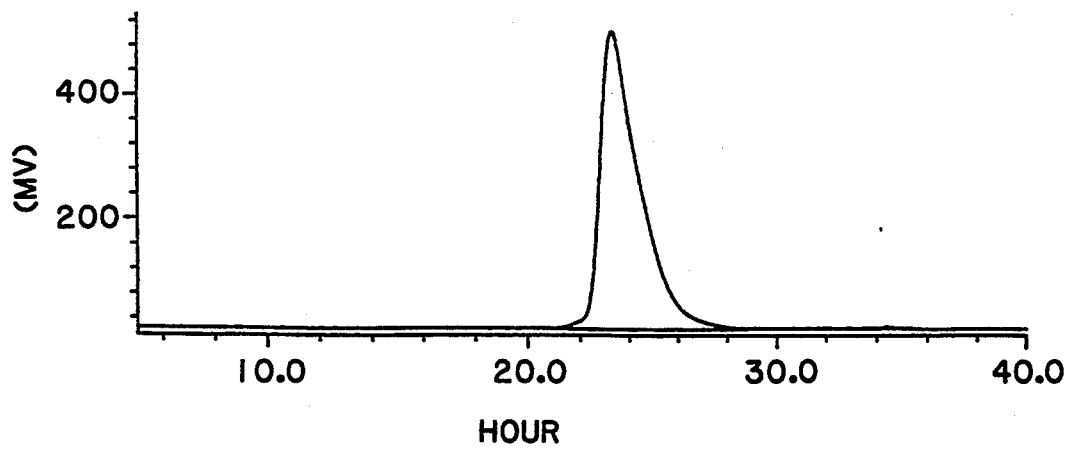
FIG. 4 shows a GPC elution curve of the poly(p-methoxymethoxy-α-methylstyrene) having number average molecular weight of 90,000 g/mole, synthesized in the Example 4.

From the $^1$H-NMR spectrum of this product that showed the same characteristic absorptions as those of Example 3, it was found that this product was poly(p-methoxymethoxy-α-methylstyrene) having some unreacted active ends remaining in the methoxymethoxy groups, and from its GPC elution curve (FIG. 4), it was found to be a monodispersion (M$_w$/M$_n$=1.11).

The number average molecular weight measured by a film osmometer was $9.0 \times 10^4$ g/mole.

Example 5.

1,000 ml of tetrahydrofuran as solvent and $4 \times 10^3$ mole of n-butyl lithium as polymerization initiator were introduced into a 2 liter flask, mixed and cooled to $-78°$ C. A liquid mixture consisting of 45 g p-methoxymethoxystyrene and 5 g styrene was added, and a polymerization reaction carried out for 1 hour with stirring. The resulting solution had a red color. Next, methanol was added to the reaction solution to terminate the reaction, and the solution poured into methanol to precipitate the polymer. This precipitate was separated and dried, giving 29.5 g of a white product.

From its $^1$H-NMR spectrum, it was verified that this product was a random copolymer containing 10% styrene and 90% p-methoxymethoxystyrene wherein styrene and p-methoxymethoxystyrene monomer units were randomly arranged. Tg as measured by DSC was 110° C.

Figure 5:
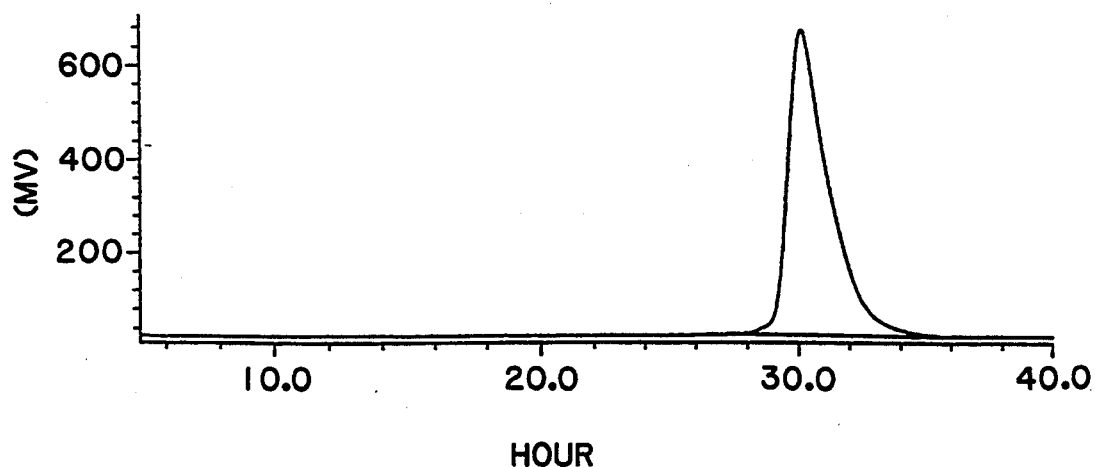
FIG. 5 shows a GPC elution curve of the monodispersion copolymer having number average molecular weight of 11,000 g/mole, synthesized in the Example 5.

From its GPC elution curve (FIG. 5), it was found to be a monodispersion copolymer ($_w$/M$_n$=1.13).

The number average molecular weight measured by a film osmometer was $1.1 \times 10^4$ g/mole.

The aforesaid $^1$H-NMR results were as follows:
1.4–2.2 ppm: (broad, 3H, —CH$_2$—CH—)
3.5–4.0 ppm: (broad, 3H, —OCH$_3$)
5.0–5.5 ppm: (broad, 2H, —O—CH$_2$—O—)
6.0–7.0 ppm: (broad, 4H, C$_6$H$_4$)

Example 6

1.5 l liter of tetrahydrofuran as solvent and $2 \times 10^3$ mole of cumyl cesium as initiator were introduced into a 2 liter flask, mixed and cooled to $-78°$ C.

Next, a solution containing 60 g p-methoxymethoxystyrene and 40 g styrene dissolved in 200 ml tetrahydrofuran was added, and a polymerization reaction carried out for 2 hours with stirring. The resulting solution had a red color. Next, methanol was added to the reaction solution to terminate the reaction, and the solution poured into methanol to precipitate the polymer. This precipitate was separated and dried, giving 100 g of a white product.

The $^1$H-NMR spectrum of this product showed the same characteristic absorptions as those of Example 5. This confirmed that the product was a random copolymer containing 40% styrene and 60% p-methoxymethoxystyrene wherein styrene and p-methoxymethoxystyrene monomer units were randomly arranged.

Figure 6:
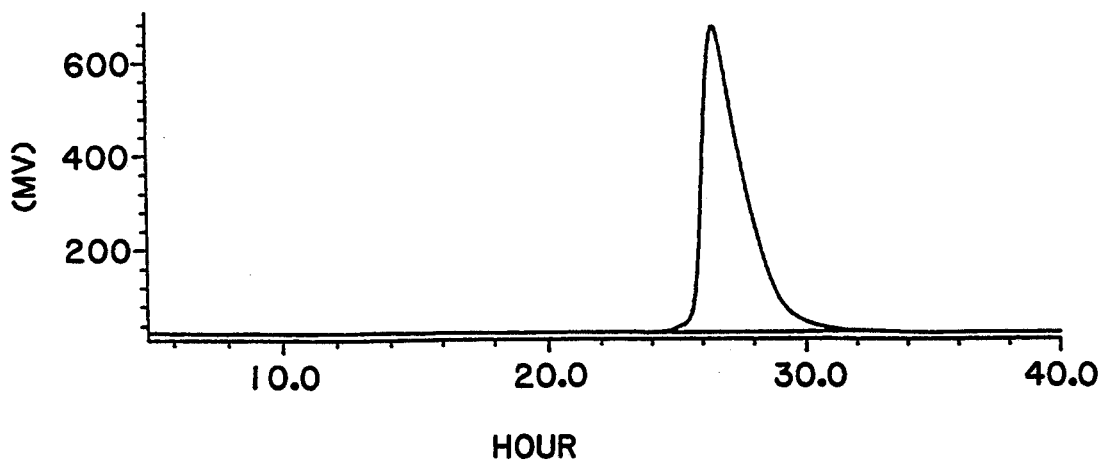
FIG. 6 shows a GPC elution curve of the monodispersion copolymer having number average molecular weight of 41,000 g/mole, synthesized in the Example 6.

From its GPC elution curve (FIG. 6), it was found to be a monodispersion copolymer ($M_w/M_n=1.21$).

The number average molecular weight measured by a film osmometer was $4.1 \times 10^4$ g/mole.

Example 7.

1,500 ml of tetrahydrofuran as solvent and $8 \times 10^3$ mole of n-butyl lithium as initiator were introduced into a 2 liter flask, mixed and cooled to $-78°$ C.

50 g p-methoxymethoxystyrene was added, and a reaction carried out for 1 hour. Next, 20 g of styrene was added, and a polymerization reaction carried out for 1 hour with stirring.

Methanol was added to the reaction solution to terminate the reaction, and the solution poured into methanol to precipitate the polymer. This precipitate was separated and dried, giving 70 g of a white product.

The $^1$H-NMR spectrum of this product showed the same characteristic absorptions as those of Example 5. This confirmed that the product was a block copolymer containing 28.5% styrene and 71.5% p-methoxymethoxystyrene.

Figure 7:
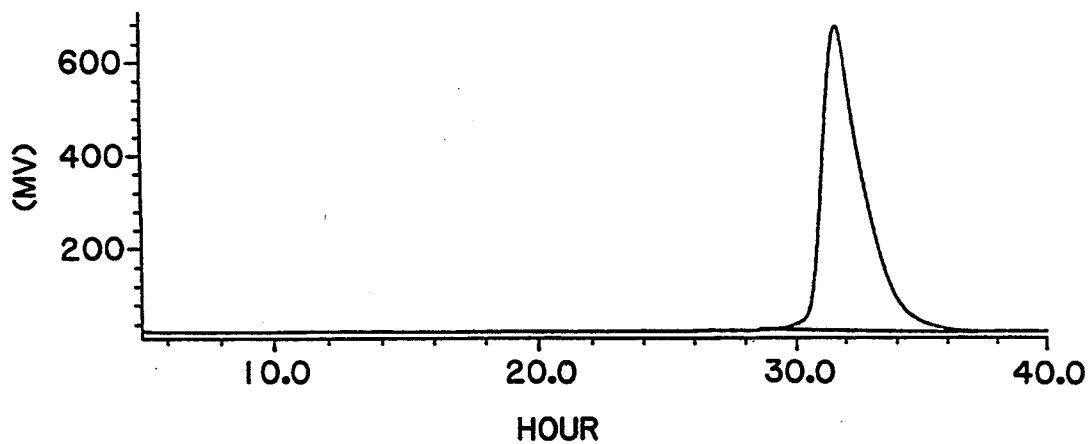
FIG. 7 shows a GPC elution curve of the monodispersion copolymer having number average molecular weight of 8,000 g/mole, synthesized in the Example 7.

From its GPC elution curve (FIG. 7), it was found to be a monodispersion.

The number average molecular weight measured by a film osmometer was $8 \times 10^3$ g/mole.

Example 8.

1,800 ml of tetrahydrofuran as solvent and $9 \times 10^{-3}$ mole of n-butyl lithium as initiator were introduced into a 2 liter flask, mixed and cooled to $-78°$ C.

5 g of styrene was added, and a reaction carried out for 1 hour. Next, 95 g of p-methoxymethoxy-α-methylstyrene was added, and a polymerization reaction carried out for 20 hours with stirring. The resulting solution had a red color. Methanol was added to the reaction solution to terminate the reaction, and the solution poured into methanol to precipitate the polymer. This precipitate was separated and dried, giving 100 g of a white product.

From the $^1$H-NMR spectrum of this product, this confirmed that the product was a block copolymer containing 5% styrene and 95 p-methoxymethoxy-α-methylstyrene.

Figure 8:
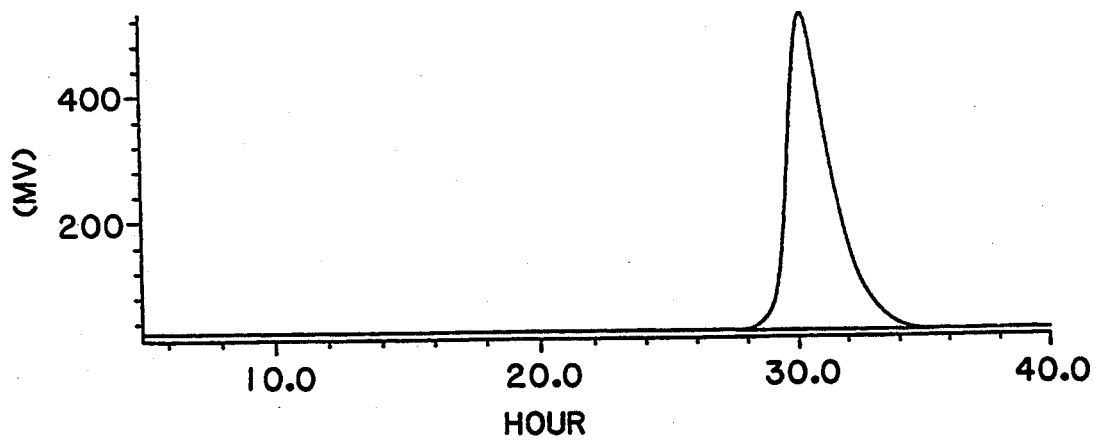
FIG. 8 shows a GPC elution curve of the monodispersion copolymer having number average molecular weight of 10,000 g/mole, synthesized in the Example 8.

From its GPC elution curve (FIG. 8), it was found to be a monodispersion copolymer($M_w/M_n=1.11$).

The number average molecular weight measured by a film osmometer was $5.5 \times 10^4$ g/mole.

The aforesaid $^1$H-NMR results were as follows:
1.4–2.2 ppm: (broad, 3H, —CH$_2$—CH—)
1.4–1.8 ppm: (broad, 2H, —CH$_2$—C(CH$_3$)—)
1.5–2.0 ppm: (broad, 3H, —CH$_2$—C(CH$_3$)—)
1.3–1.6 ppm: (broad, 3H, —OC(CH$_3$)$_3$—)
3.5–4.0 ppm: (broad, 2H, —O—CH$_3$)
5.0–5.5 ppm: (broad, 2H, —O—CH$_2$—O—)
6.0–7.0 ppm: (broad, 4H, C$_6$H$_4$)

Example 9.

1,500 ml of tetrahydrofuran as solvent and $1 \times 10^{-3}$ mole of cumyl cesium as initiator were introduced into a 2 liter flask, mixed and cooled to $-78°$ C.

20 g of styrene was added, and a reaction carried out for 1 hour. Next, 20 g of p-methoxymethoxy-α-methylstyrene was added, and a polymerization reaction carried out for 5 hours with stirring. The resulting solution had a red color. Methanol was added to the reaction solution to terminate the reaction, and the solution poured into methanol to precipitate the polymer. This precipitate was separated and dried, giving 40 g of a white product.

From the $^1$H-NMR spectrum of this product that showed the same characteristic absorptions as those of Example 8, this confirmed that the product was a block copolymer containing 50% styrene and 50% p-methoxymethoxy-α-methylstyrene.

Figure 9:
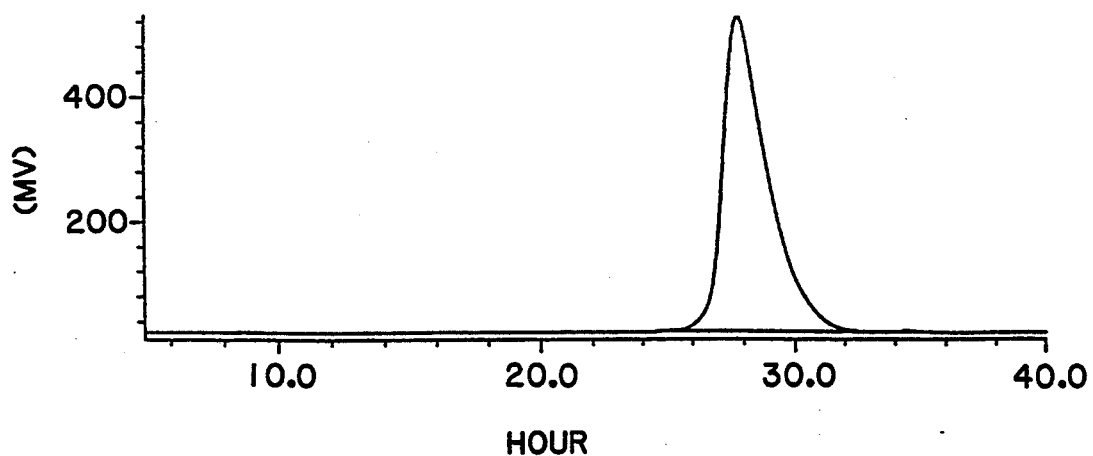
FIG. 9 shows a GPC elution curve of the monodispersion copolymer having number average molecular weight of 35,000 g/mole, synthesized in the Example 9.

From its GPC elution curve (FIG. 9), it was found to be a monodispersion copolymer ($M_w/M_n=1.14$).

The number average molecular weight measured by a film osmometer was $3.5 \times 10^4$ g/mole.

Example 10.

1,000 ml of tetrahydrofuran as solvent and $2 \times 10^{-3}$ mole of n-butyl lithium as initiator were introduced into a 2 liter flask, mixed and cooled to $-20°$ C.

10 g of α-methylstyrene was added, and a initiation reaction carried out for 1 hour, and a polymerization reaction carried out for 8 hours in $-78°$ C. with stirring. Next, 30 g of p-methoxymethoxy-α-methylstyrene was added, and a polymerization reaction carried out for 20 hours with stirring. The resulting solution had a red color. Methanol was added to the reaction solution to terminate the reaction, and the solution poured into methanol to precipitate the polymer. This precipitate was separated and dried, giving 40 g of a white product.

From the $^1$H-NMR spectrum of this product, this confirmed that the product was a block copolymer containing 25% α-methylstyrene and 75% p-methoxymethoxy-α-methylstyrene.

Figure 10:
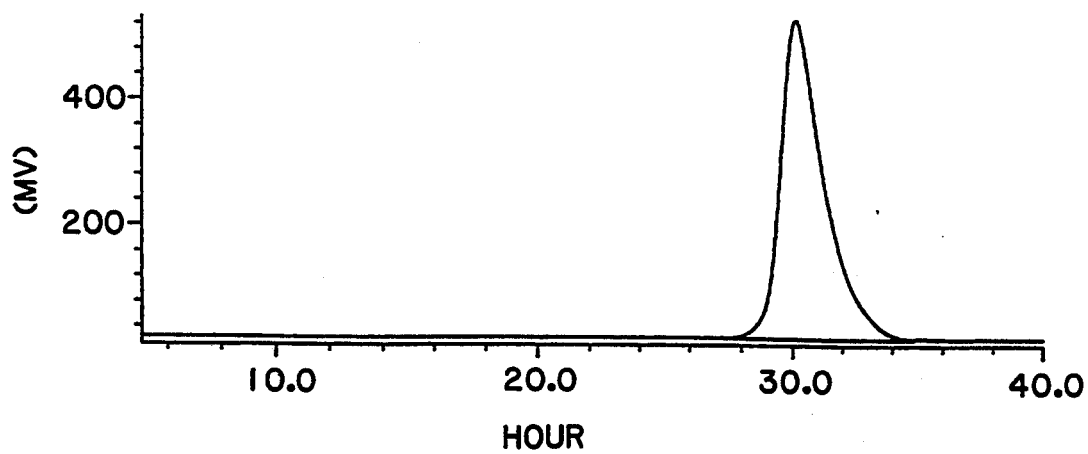
FIG. 10 shows a GPC elution curve of the monodispersion copolymer having number average molecular weight of 18,000 g/mole, synthesized in the Example 10.

From its GPC elution curve (FIG. 10), it was found to be a monodispersion copolymer ($M_w/M_n=1.11$).

The number average molecular weight measured by a film osmometer was $1.8 \times 10^4$ g/mole.

Example 11.

700 ml of tetrahydrofuran as solvent and $4 \times 10^{-3}$ mole of n-butyl lithium as initiator were introduced into a 2 liter flask, mixed and cooled to $-78°$ C., 20 g of p-methoxymethoxystyrene was added, and a reaction carried out for 1 hour. Next, 20 g of p-methoxymethoxy-α-methylstyrene was added, and a polymerization reaction carried out for 20 hours with stirring. The resulting solution had a red color. Methanol was added to the reaction solution to terminate the reaction, and the solution poured into methanol to precipitate the polymer. This precipitate was separated and dried, giving 40 g of a white product.

From the $^1$H-NMR spectrum of this product, this confirmed that the product was a block copolymer containing 50% p-methoxymethoxystyrene and 50% p-methoxymethoxy-α-methylstyrene. Tg as measured by DSC was 110° C.

Figure 11:
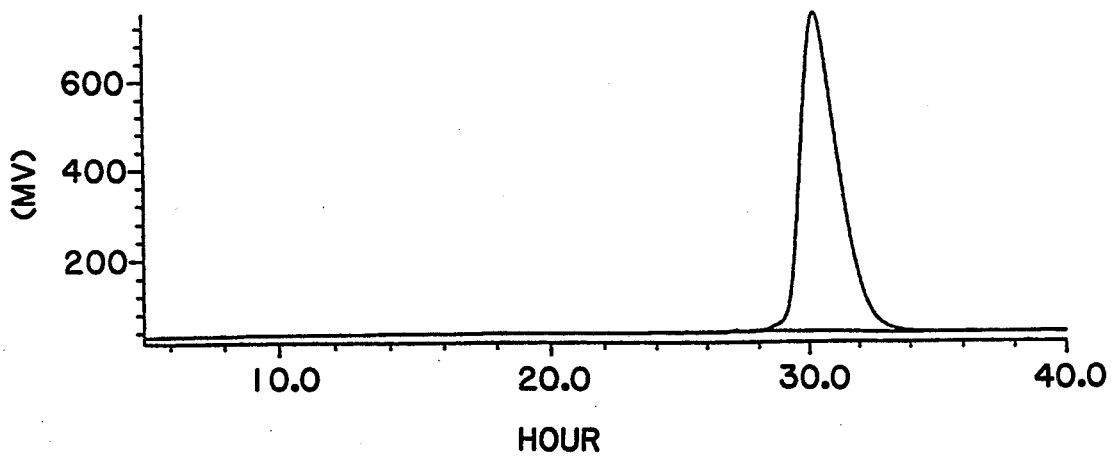
FIG. 11 shows a GPC elution curve of the monodispersion copolymer having number average molecular weight of 9,500 g/mole, synthesized in the Example 11.

From its GPC elution curve (FIG. 11), it was found to be a monodispersion copolymer ($M_w/M_n=1.05$).

The number average molecular weight measured by a film osmometer was $9.5 \times 10^3$ g/mole.

The aforesaid $^1$H-NMR results were as follows:
1.4–2.2 ppm: (broad, 3H, —CH$_2$—CH—)
1.4–1.8 ppm: (broad, 2H, —CH$_2$—C(CH$_3$)—)
1.5–2.0 ppm: (broad, 3H, —CH$_2$—C(CH$_3$)—)
3.5–4.0 ppm: (broad, 3H, —CH$_3$)
5.0–5.5 ppm: (broad, 2H, —O—CH$_2$—O—)
6.0–7.0 ppm: (broad, 4H, C$_6$H$_4$)

Example 12.

2,500 ml of tetrahydrofuran as solvent and $5 \times 10^{-3}$ mole of cumyl cesium as initiator were introduced into a 3 liter flask, mixed and cooled to $-78°$ C.

30 g of p-methoxymethoxystyrene was added, and a reaction carried out for 1 hour. Next, 70 g of p-methoxymethoxy-α-methylstyrene was added, and a polymerization reaction carried out for 5 hours with stirring. The resulting solution had a red color. Methanol was added to the reaction solution to terminate the reaction, and the solution poured into methanol to precipitate the polymer. This precipitate was separated and dried, giving 100 g of a white product.

From the $^1$H-NMR spectrum of this product that showed the same characteristic absorptions as those of Example 11, this confirmed that the product was a block copolymer containing 30% p-methoxymethoxystyrene and 70% p-methoxymethoxy-α-methylstyrene.

Figure 12:
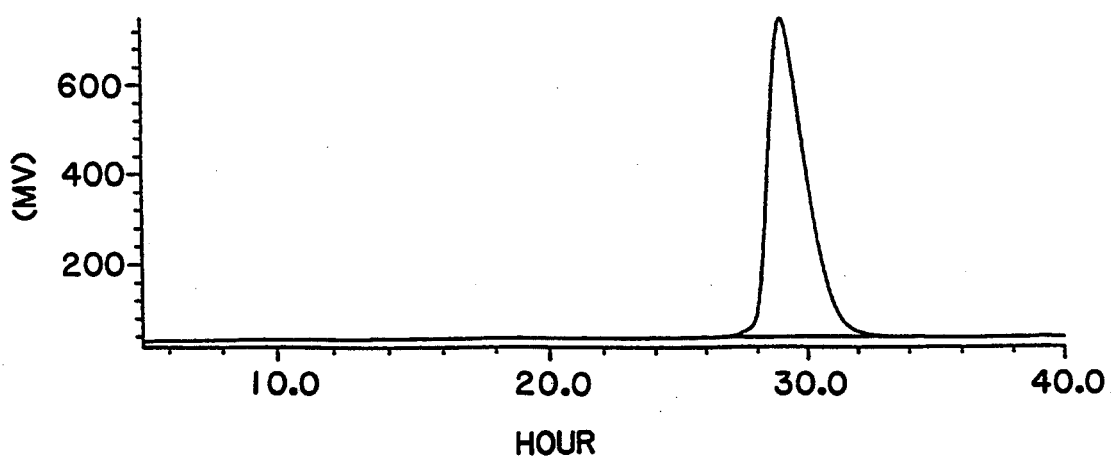
FIG. 12 shows a GPC elution curve of the monodispersion copolymer having number average molecular weight of 18,500 g/mole, synthesized in the Example 12.

From its GPC elution curve (FIG. 12), it was found to be a monodispersion copolymer ($M_w/M_n = 1.08$).

The number average molecular weight measured by a film osmometer was $1.85 \times 10^3$ g/mole.

Example 13.

2,500 ml of tetrahydrofuran as solvent and $2 \times 10^{-2}$ mole of n-butyl lithium as initiator were introduced into a 3 liter flask, mixed and cooled to $-78°$ C.

A liquid mixture consisting of 180 g p-methoxymethoxystyrene and 20 g styrene was then added, and a polymerization reaction carried out for 2 hours with stirring. The resulting solution had a red color.

Figure 13:
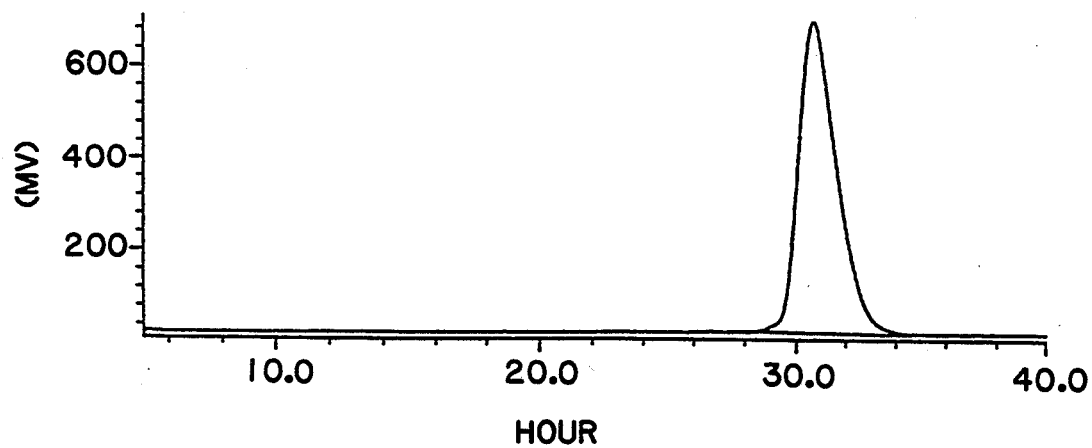
FIG. 13 shows a GPC elution curve of the monodispersion copolymer having number average molecular weight of 9,500 g/mole, synthesized in the Example 13.

The reaction was terminated by adding methanol to the reaction solution, and the solution poured into methanol to precipitate the polymer. This precipitate was separated and dried, giving 200 g of a white product. From its $^1$H-NMR spectrum, it was found that this product was a copolymer consisting of 90%p-methoxymethoxystyrene and 10% styrene. From its GPC elution curve (FIG. 13), it was found to be a monodispersion copolymer ($M_w/M_n = 1.05$).

The aforesaid $^1$H-NMR results were as follows:
1.4–2.2 (broad, 3H, —CH$_2$—CH—)
3.5–4.0 (broad, 3H, —OCH$_3$)
5.0–5.5 (broad, 2H, —O—CH$_2$—O—)
6.0–7.0 (broad, 4H, C$_6$H$_4$)

The number average molecular weight measured by a film osmometer was 9,500 g/mole.

Next, 50 g of the copolymer obtained was added to 500 ml of acetone, and dissolved. A small amount of concentrated hydrochloric acid was added at 60° C., the mixture stirred for 10 hours, and poured into water. The resulting precipitate was then washed and dried, giving 35 g of product.

Figure 14:
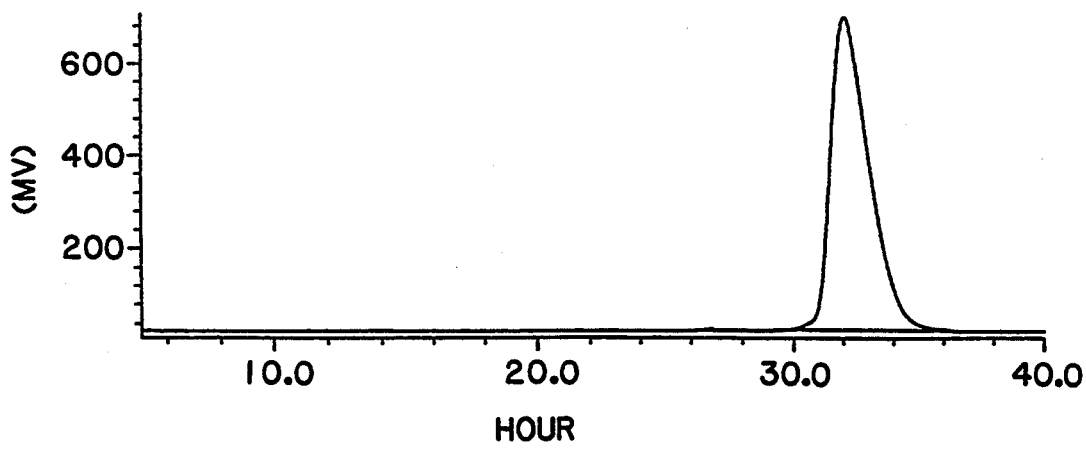
FIG. 14 shows a GPC elution curve of the monodispersion copolymer having number average molecular weight of 6,500 g/mole, synthesized in the Example 13.

From the $^1$H-NMR spectrum of the product obtained, no peaks due to methoxymethoxy groups were observed, and it was therefore concluded that this polymer was a copolymer of p-hydroxystyrene and styrene containing no methoxy- methoxy groups. Further, from its GPC elution curve (FIG. 14), it was found to be a monodispersion copolymer ($M_w/M_n = 1.05$).

The number average molecular weight measured by a film osmometer was 6,500 g/mole.

Example 14.

1.5 liter of tetrahydrofuran as solvent and $2 \times 10^{-3}$ mole of cumyl cesium as initiator were introduced into a 2 liter flask, mixed and cooled to $-78°$ C.

Next, a solution containing 50 g p-methoxymethoxystyrene and 50 g styrene dissolved in 200 ml tetrahydrofuran was added, and a polymerization reaction carried out for 2 hours with stirring. The resulting solution had a red color. Next, methanol was added to the reaction solution to terminate the reaction, and the solution poured into methanol to precipitate the polymer. This precipitate was separated and dried, giving 100 g of a white product.

The $^1$H-NMR spectrum of this product showed the same characteristic absorptions as those of Example 13. This verified that the product was a copolymer containing 50% p-methoxymethoxystyrene and 50% styrene.

Figure 15:
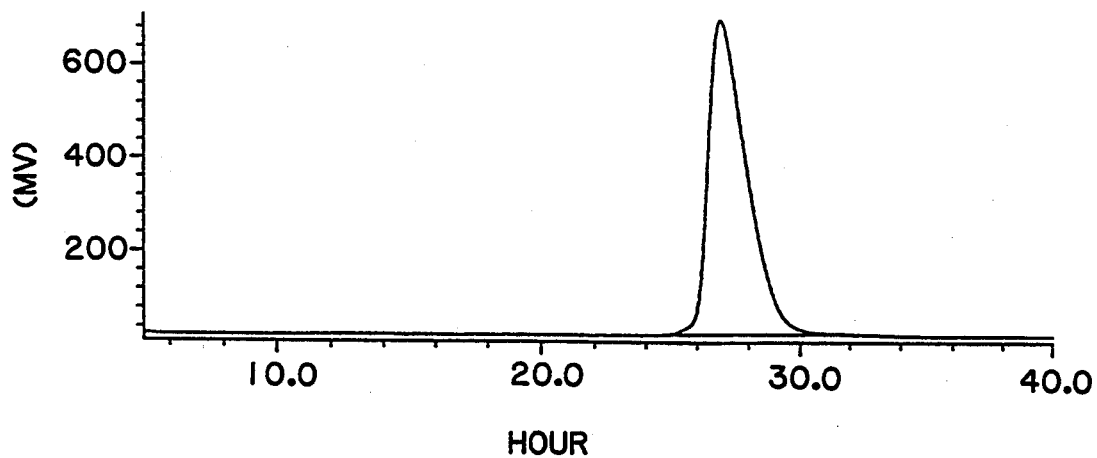
FIG. 15 shows a GPC elution curve of the monodispersion copolymer having number average molecular weight of 45,000 g/mole, synthesized in the Example 14.

From its GPC elution curve (FIG. 15), it was found to be a monodispersion copolymer ($M_w/M_n = n1.11$).

The number average molecular weight measured by a film osmometer was $4.5 \times 10^4$ g/mole.

Next, 10 g of the copolymer obtained was added to 100 ml of acetone, and dissolved. A small amount of concentrated hydrochloric acid was added at 60° C., the mixture stirred for 8 hours, and poured into water. The resulting precipitate was then washed and dried, giving 8 g of product.

Figure 16:
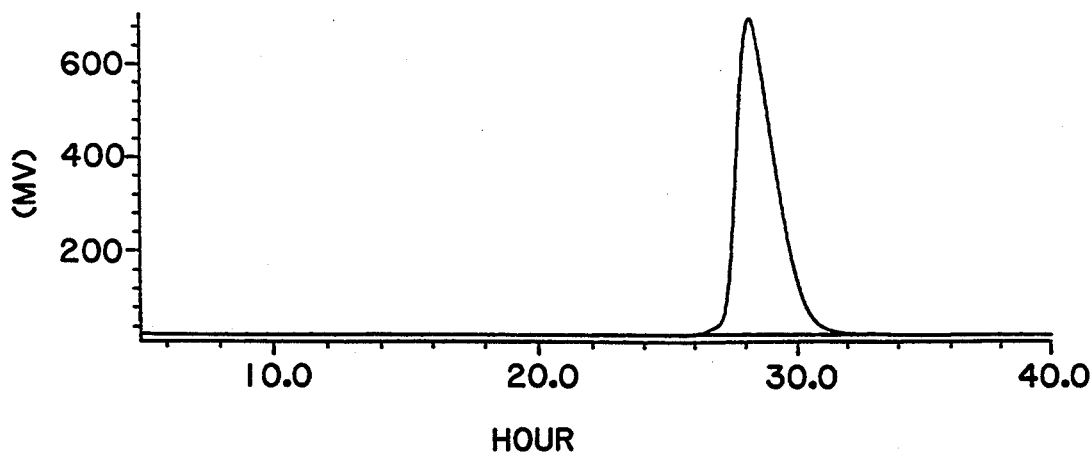
FIG. 16 shows a GPC elution curve of the monodispersion copolymer having number average molecular weight of 35,000 g/mole, synthesized in the Example 14.

From the $^1$H-NMR spectrum of the product obtained, no peaks due to methoxymethoxy groups were observed, and it was therefore concluded that this polymer was a copolymer of p-hydroxystyrene and styrene containing no methoxy- methoxy groups. Further, from its GPC elution curve (FIG. 16), it was found to be a monodispersion copolymer.

The number average molecular weight measured by a film osmometer was $3.5 \times 10^4$ g/mole.

Example 15.

1.5 liter of tetrahydrofuran as solvent and $8 \times 10^{-4}$ mole of n-butyl lithium as initiator were introduced into a 2 liter flask, mixed and cooled to $-78°$ C.

80 g of p-methoxymethoxystyrene was added, and a reaction carried out for 2 hours. Next, a solution containing 20 g styrene dissolved in 200 ml tetrahydrofuran was added, and a polymerization reaction carried out for 20 hours with stirring. The resulting solution had a red color. Next, methanol was added to the reaction solution to terminate the reaction, and the solution poured into methanol to precipitate the polymer. This precipitate was separated and dried, giving 80 g of a white product.

The $1^1$ H-NMR spectrum Of this product showed the same characteristic absorptions as those of Example 13. This verified that the product was a copolymer containing 80% p-methoxymethoxystyrene and 20% styrene.

Figure 17:
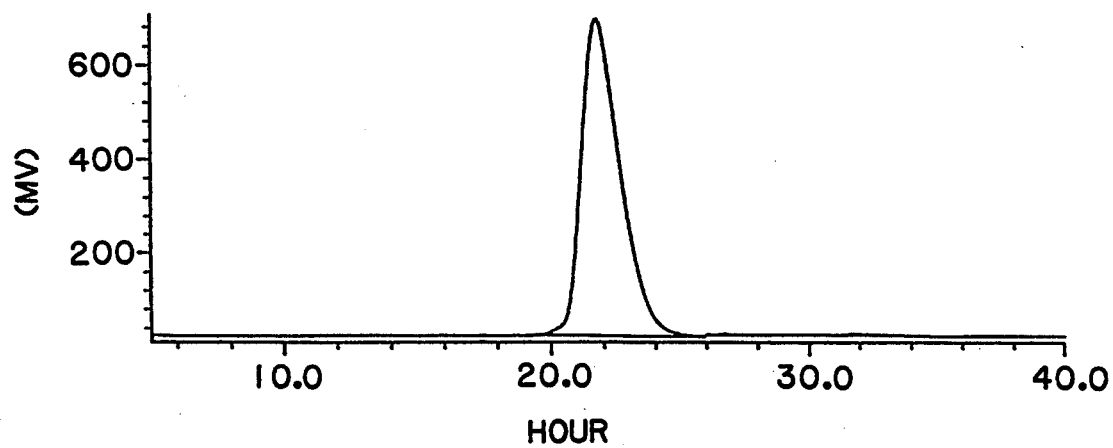
FIG. 17 shows a GPC elution curve of the monodispersion copolymer having number average molecular weight of 110,000 g/mole, synthesized in the Example 15.

From its GPC elution curve (FIG. 17), it was found to be a monodispersion copolymer ($M_w/M_n = 1.13$).

The number average molecular weight measured by a film osmometer was $11.0 \times 10^4$ g/mole.

Next, 20 g of the copolymer obtained was added to 200 ml of acetone, and dissolved. A small amount of concentrated hydrochloric acid was added at 60° C., the mixture stirred for 8 hours, and poured into water. The resulting precipitate was then washed and dried, giving 14 g of product.

Figure 18:
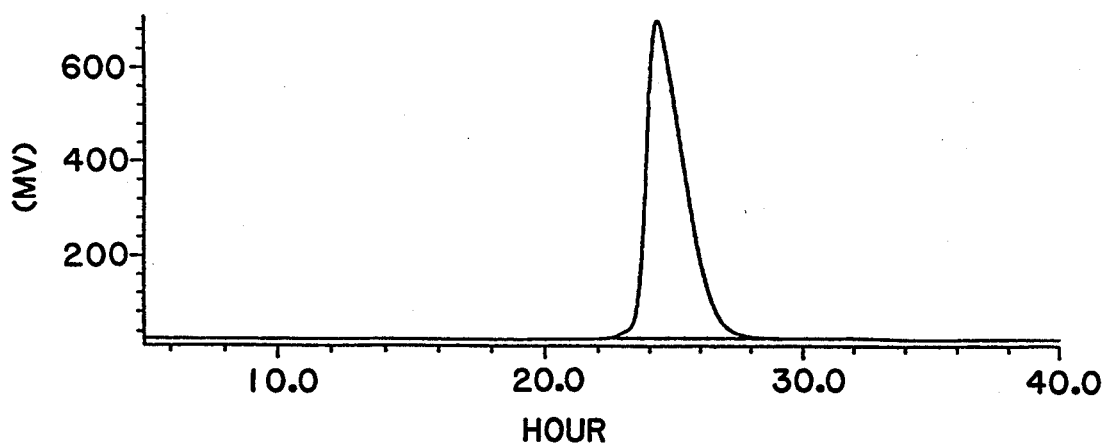
FIG. 18 shows a GPC elution curve of the monodispersion copolymer having number average molecular weight of 82,000 g/mole, synthesized in the Example 15.

From the $^1$H-NMR spectrum of the product obtained, no peaks due to methoxymethoxy groups were observed, and it was therefore concluded that this polymer was a copolymer of poly(p-hydroxystyrene) and polystyrene containing no methoxy- methoxy groups. Further, from its. GPC elution curve (FIG. 18), it was found to be a monodispersion copolymer.

The number average molecular weight measured by a film osmometer was $8.2 \times 10^4$ g/mole.

What is claimed:

1. A monodispersion polymer having at least a monomer unit represented by the following general formula (I), and having a molecular weight which lies in the range 500-500,000:

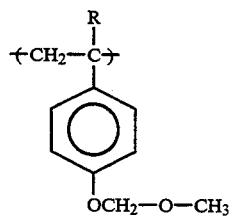

General formula (I)

where R is a hydrogen atom or methyl group, and the R in the molecule may be identical or different.

2. A monodispersion polymer as defined in claim 1 wherein the polymer is represented by the following general formula (I');

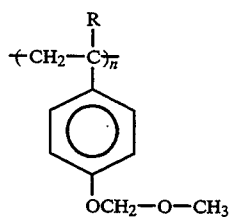

General formula (I')

where n is a number of 3~3,000.

3. A monodispersion polymer as defined in claim 2 wherein the polymer is represented by the following general formula:

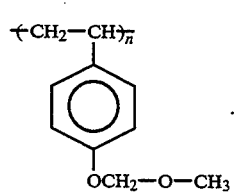

4. A monodispersion polymer as defined in claim 2 wherein the polymer is represented by the following general formula:

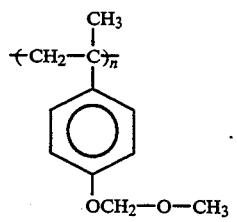

5. A monodispersion polymer as defined in claim 1 wherein the polymer has the monomer units that are represented by the following formulae:

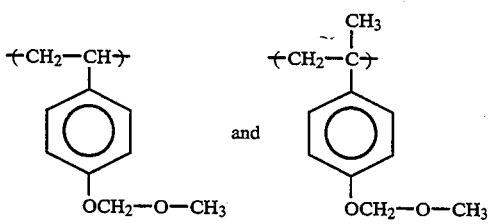

6. A monodispersion polymer as defined in claim 1 wherein the polymer further has a styrene monomer unit of the formula

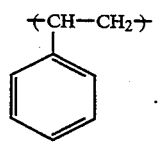

7. A monodispersion polymer as defined in claim 6 wherein the polymer has a styrene monomer unit and the monomer unit that is represented by the following formula:

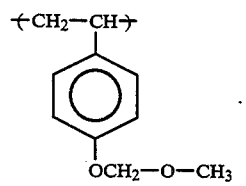

8. A monodispersion polymer as defined in claim 6 wherein the polymer has a styrene monomer unit and the monomer unit that is represented by the following formula:

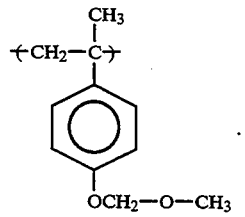

9. A monodispersion polymer as defined in claim 6 wherein the polymer has the monomer units that are represented by the following formulae:

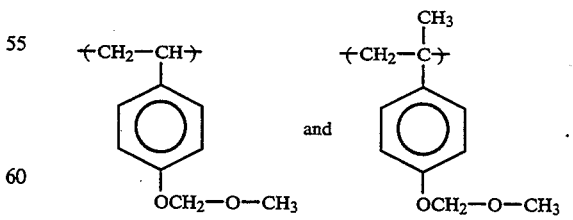

10. A monodispersion polymer as defined in claim 6 wherein the polymer is a random copolymer.

11. A monodispersion polymer as defined in claim 6 wherein the polymer is a block copolymer.

12. A monodispersion polymer as defined in claim 9 wherein the polymer is a random copolymer.

13. A monodispersion polymer as defined in claim 9 wherein the polymer is a block copolymer.

14. A monodisperse polymer of claim 1 which additionally contains monomer units of the formula

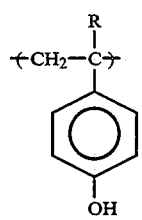

where R is a hydrogen atom or methyl group and the R in the molecule may be identical or different.

15. A monodispersion polymer as defined in claim 14, wherein the reactant polymer has a styrene monomer unit and the monomer unit represented by the following formula:

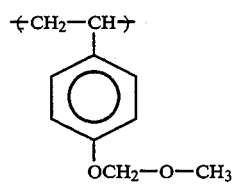

16. A monodispersion polymer as defined in claim 14 wherein the reactant polymer has a styrene monomer unit and the monomer unit represented by the following formula:

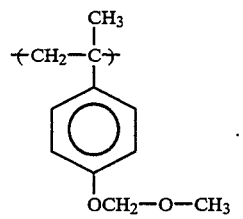

17. A monodispersion polymer as defined in claim 14, wherein the reactant polymer has a styrene monomer unit and the monomer units represented by the following formulae:

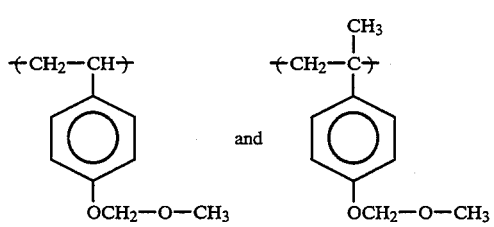

18. A monodisperse polymer as defined in claim 1 wherein the ratio of the weight average molecular weight $M_w$ to the number average molecular weight $M_n$ lies within the range of 1.01–1.50.

* * * * *